(12) United States Patent
Chen et al.

(10) Patent No.: US 11,163,103 B2
(45) Date of Patent: Nov. 2, 2021

(54) LIGHTING FIXTURE

(71) Applicant: QISDA CORPORATION, Taoyuan (TW)

(72) Inventors: Zih-Ling Chen, Taoyuan (TW); Chih-Lung Huang, New Taipei (TW)

(73) Assignee: Qisda Corporation, Taoyuan (TW)

(*) Notice: Subject to any disclaimer, the term of this patent is extended or adjusted under 35 U.S.C. 154(b) by 0 days.

(21) Appl. No.: 16/984,144

(22) Filed: Aug. 3, 2020

(65) Prior Publication Data
US 2021/0055470 A1 Feb. 25, 2021

(30) Foreign Application Priority Data
Aug. 20, 2019 (CN) .......................... 201910769645.4

(51) Int. Cl.
*F21V 8/00* (2006.01)
*F21S 6/00* (2006.01)
*F21V 21/26* (2006.01)

(52) U.S. Cl.
CPC ............ *G02B 6/0053* (2013.01); *F21S 6/003* (2013.01); *G02B 6/0058* (2013.01); *G02B 6/0068* (2013.01); *F21V 21/26* (2013.01)

(58) Field of Classification Search
CPC .. G02B 6/0053; G02B 6/0058; G02B 6/0068; F21S 6/003; F21S 6/002; F21V 21/26; F21V 19/00; F21V 23/00
See application file for complete search history.

(56) References Cited

U.S. PATENT DOCUMENTS

| 2003/0030764 A1* | 2/2003 | Lee ...................... G02B 6/0065 349/65 |
| 2011/0310616 A1* | 12/2011 | Carruthers ........... G02B 6/0036 362/296.05 |

FOREIGN PATENT DOCUMENTS

KR 20080057647 A * 6/2008 ....... G02F 1/133615

* cited by examiner

*Primary Examiner* — Donald L Raleigh

(57) ABSTRACT

A lighting fixture includes a light emitting module, a first brightness enhancement component and a second brightness enhancement component. The light emitting module includes a light emitting surface. The first brightness enhancement component is disposed on the light emitting surface and corresponds to a first light emitting area of the light emitting module. The first brightness enhancement component concentrates light emitted from the first light emitting area with respect to a first plane, wherein the first plane is defined by a first axis and a first direction perpendicular to the first brightness enhancement component. The second brightness enhancement component concentrates light emitted from the second light emitting area with respect to a second plane, wherein the second plane is defined by a second axis and a second direction perpendicular to the second brightness enhancement component, and the first axis is not parallel to the second axis.

13 Claims, 6 Drawing Sheets

LIGHTING FIXTURE

BACKGROUND OF THE INVENTION

1. Field of the Invention

The invention relates to a lighting fixture and, more particularly, to a lighting fixture capable of adjusting a lighting pattern and a lighting range.

2. Description of the Prior Art

At present, various lighting fixtures are considered a necessity by a lot of people in their daily lives. In general, a conventional lighting fixture can only generate one single lighting pattern, such that a lighting range of the lighting fixture cannot be adjusted according to different lighting requirements. For example, a lighting fixture with a longitudinal light head only generates a longitudinal lighting pattern to provide a longitudinal lighting range and another lighting fixture with a circular light head only generates a circular lighting pattern to provide a circular lighting range. Accordingly, when a user has different lighting requirements, the user needs to purchase different light fixtures correspondingly, such that it results in additional expense.

SUMMARY OF THE INVENTION

The invention provides a lighting fixture capable of adjusting a lighting pattern and a lighting range, so as to solve the aforesaid problems.

According to an embodiment of the invention, a lighting fixture comprises a light emitting module, a first brightness enhancement component and a second brightness enhancement component. The light emitting module comprises a light emitting surface. The first brightness enhancement component is disposed on the light emitting surface and corresponds to a first light emitting area of the light emitting module. The first brightness enhancement component concentrates light emitted from the first light emitting area with respect to a first plane, wherein the first plane is defined by a first axis and a first direction perpendicular to the first brightness enhancement component. The second brightness enhancement component is disposed on the light emitting surface and corresponds to a second light emitting area of the light emitting module. The second brightness enhancement component concentrates light emitted from the second light emitting area with respect to a second plane, wherein the second plane is defined by a second axis and a second direction perpendicular to the second brightness enhancement component, and the first axis is not parallel to the second axis.

According to another embodiment of the invention, a lighting fixture comprises a light emitting module, a first brightness enhancement component and a second brightness enhancement component. The light emitting module comprises a light emitting surface. The first brightness enhancement component is disposed on the light emitting surface and corresponds to a first light emitting area of the light emitting module. The first brightness enhancement component comprises a plurality of first optical structures. The first optical structures are arranged side by side and parallel to a first axis to concentrate light emitted from the first light emitting area. The second brightness enhancement component is disposed on the light emitting surface and corresponds to a second light emitting area of the light emitting module. The second brightness enhancement component comprises a plurality of second optical structures. The second optical structures are arranged side by side and parallel to a second axis to concentrate light emitted from the second light emitting area, wherein the first axis is not parallel to the second axis.

According to another embodiment of the invention, a lighting fixture comprises a light emitting module, a first brightness enhancement component, a second brightness enhancement component and a third brightness enhancement component. The light emitting module comprises a light emitting surface and the light emitting surface is a rectangle. The first brightness enhancement component is a sheet attached on the light emitting surface. The first brightness enhancement component concentrates light emitted from the light emitting surface with respect to a first plane, wherein the first plane is defined by a first axis and a first direction perpendicular to the first brightness enhancement component. The second brightness enhancement component is a sheet attached on the light emitting surface. The second brightness enhancement component concentrates light emitted from the light emitting surface with respect to a second plane, wherein the second plane is defined by a second axis and a second direction perpendicular to the second brightness enhancement component, and the first axis is not parallel to the second axis. The third brightness enhancement component is a sheet attached on the light emitting surface. The second brightness enhancement component and the third brightness enhancement component are located at opposite sides of the first brightness enhancement component. The third brightness enhancement component concentrates light emitted from the light emitting surface with respect to a third plane, wherein the third plane is defined by a third axis and a third direction perpendicular to the third brightness enhancement component, and the first axis is not parallel to the third axis.

As mentioned in the above, the invention disposes a plurality of brightness enhancement components on the light emitting surface of the light emitting module. Different brightness enhancement components concentrate light emitted from the light emitting surface with respect to different planes, so as to generate different lighting patterns and different lighting ranges. Accordingly, the lighting fixture of the invention can control different light emitting areas of the light emitting module to emit light according to different lighting requirements, so as to adjust the required lighting pattern and lighting range through different brightness enhancement components.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
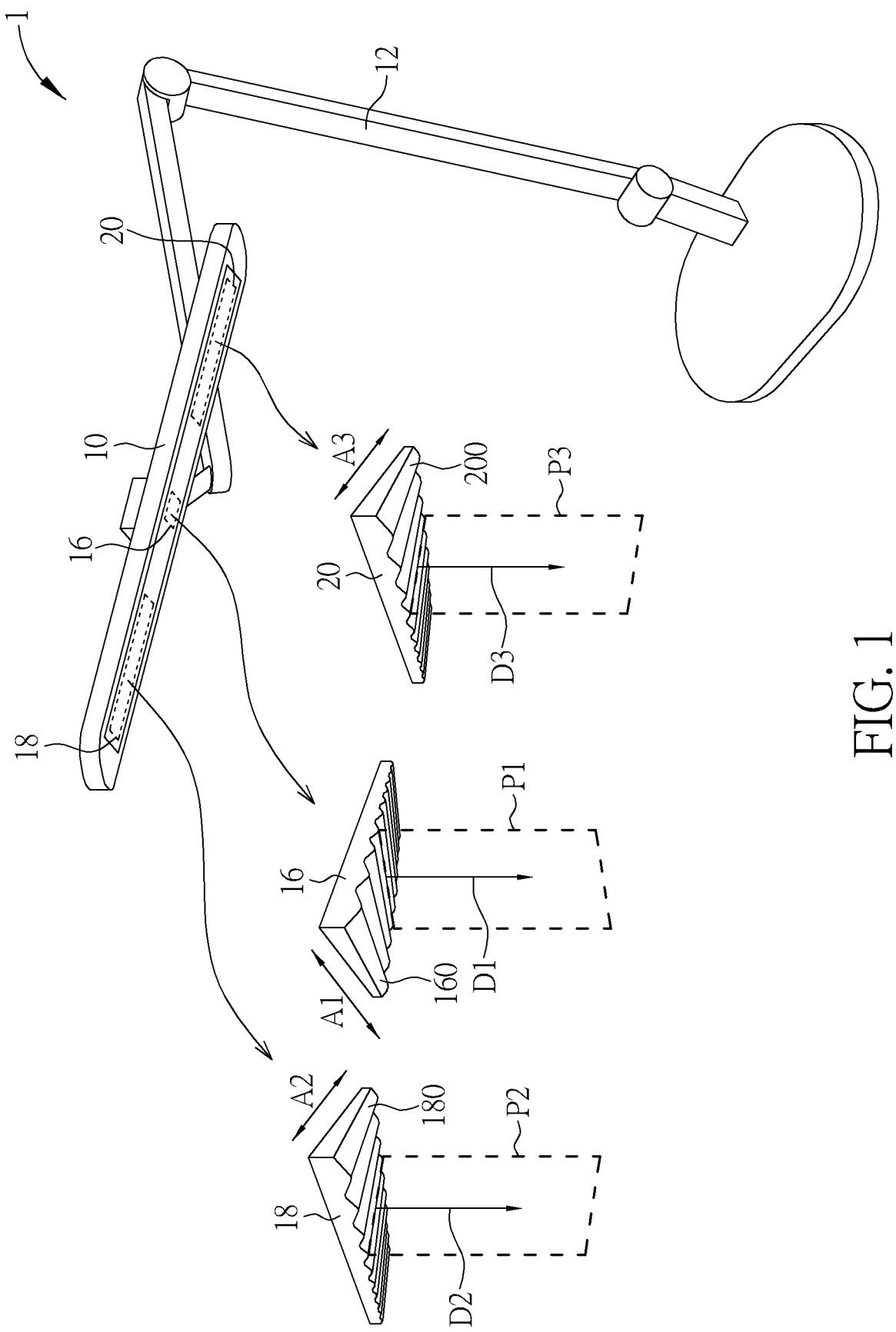
FIG. 1 is a schematic view illustrating a lighting fixture according to an embodiment of the invention.
Figure 2:
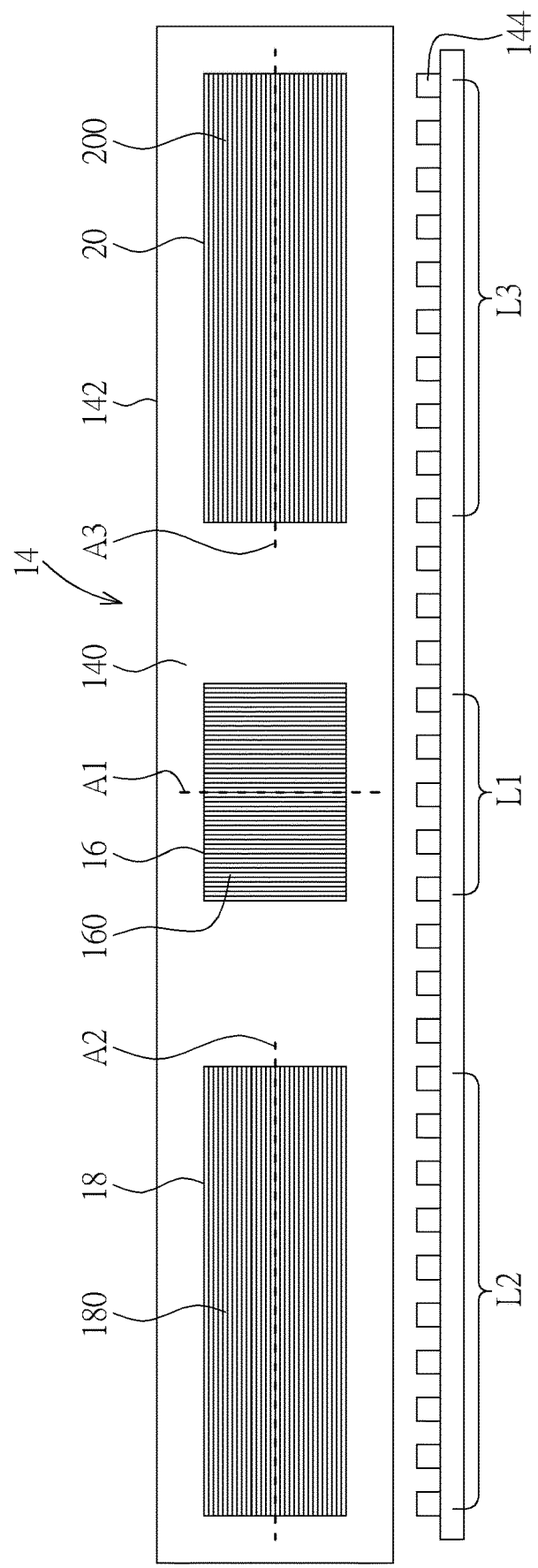
FIG. 2 is a bottom view illustrating a light emitting module according to an embodiment of the invention.
Figure 3:
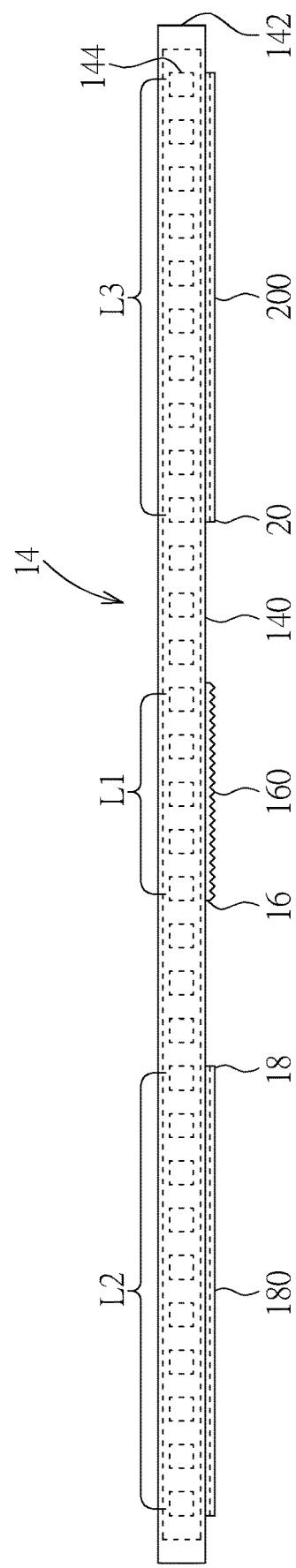
FIG. 3 is a side view illustrating the light emitting module shown in FIG. 2.
Figure 4:
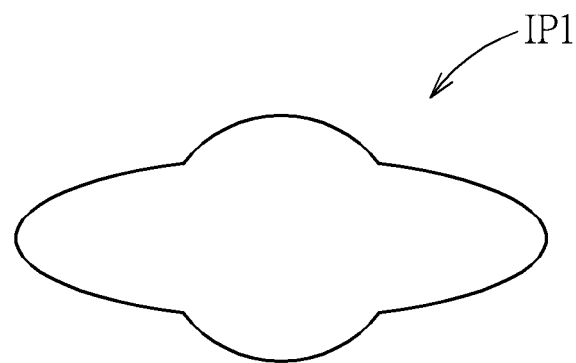
FIG. 4 is a schematic view illustrating three lighting patterns.
Figure 4:
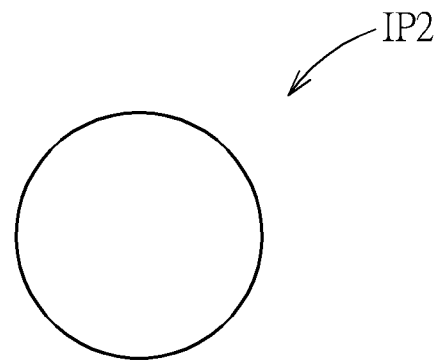
Figure 4:
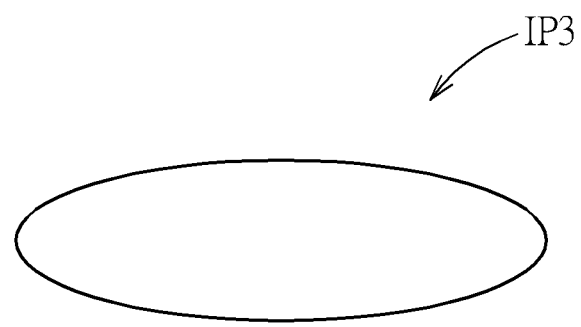

Referring to FIGS. 1 to 4, FIG. 1 is a schematic view illustrating a lighting fixture 1 according to an embodiment of the invention, FIG. 2 is a bottom view illustrating a light emitting module 14 according to an embodiment of the invention, FIG. 3 is a side view illustrating the light emitting module 14 shown in FIG. 2, and FIG. 4 is a schematic view illustrating three lighting patterns IP1, IP2, IP3.

As shown in FIGS. 1 to 3, a lighting fixture 1 comprises a light head 10, a support frame 12, a light emitting module 14, a first brightness enhancement component 16, a second brightness enhancement component 18 and a third brightness enhancement component 20. In this embodiment, the lighting fixture 1 may be a desk lamp, a wall lamp, a standing lamp or other lighting fixtures. The light head 10 is disposed on the support frame 12. The light emitting module 14 is disposed in the light head 10 and comprises a light emitting surface 140, wherein the light emitting surface 140 may be, but not limited to, a rectangle. The first brightness enhancement component 16, the second brightness enhancement component 18 and the third brightness enhancement component 20 are disposed on the light emitting surface 140.

As shown in FIGS. 2 and 3, the light emitting module 14 comprises a light guide plate 142 and a plurality of light emitting units 144, wherein the light emitting units 144 are disposed at a side of the light guide plate 142. In this embodiment, the light emitting units 144 may be, but not limited to, light emitting diodes. Light emitted from the light emitting units 144 is guided by the light guide plate 142 to the first brightness enhancement component 16, the second brightness enhancement component 18 and the third brightness enhancement component 20, so as to generate a lighting pattern correspondingly. Furthermore, the aforesaid light emitting surface 140 is located at a side of the light guide plate 142. That is to say, the light guide plate 142 provides the aforesaid light emitting surface 140.

In this embodiment, light emitted from parts of the light emitting units 144 may form a first light emitting area L1 through the light guide plate 142, light emitted from parts of the light emitting units 144 may form a second light emitting area L2 through the light guide plate 142, and light emitted from parts of the light emitting units 144 may form a third light emitting area L3 through the light guide plate 142. The first brightness enhancement component 16 corresponds to the first light emitting area L1 of the light emitting module 14, the second brightness enhancement component 18 corresponds to the second light emitting area L2 of the light emitting module 14, and the third brightness enhancement component 20 corresponds to the third light emitting area L3 of the light emitting module 14. Since the second light emitting area L2 and the third light emitting area L3 are located at opposite sides of the first light emitting area L1, the second brightness enhancement component 18 and the third brightness enhancement component 20 are located at opposite sides of the first brightness enhancement component 16.

The invention may selectively control the light emitting units 144 of the first light emitting area L1, the second light emitting area L2 and/or the third light emitting area L3 to emit light by means of a local dimming technology, such that the light passes through the first brightness enhancement component 16, the second brightness enhancement component 18 and/or the third brightness enhancement component 20 to generate a lighting pattern correspondingly. It should be noted that the local dimming technology is well known by one skilled in the art, so the explanation will not be depicted herein.

In this embodiment, the first brightness enhancement component 16, the second brightness enhancement component 18 and the third brightness enhancement component 20 may be brightness enhancement films (BEFs). Accordingly, the first brightness enhancement component 16, the second brightness enhancement component 18 and the third brightness enhancement component 20 may be sheets attached on the light emitting surface 140, and the first brightness enhancement component 16, the second brightness enhancement component 18 and the third brightness enhancement component 20 are flexible. The first brightness enhancement component 16 may comprise a plurality of first optical structures 160, wherein the first optical structures 160 are arranged side by side and parallel to a first axis A1 to concentrate light emitted from the first light emitting area L1. The second brightness enhancement component 18 may comprise a plurality of second optical structures 180, wherein the second optical structures 180 are arranged side by side and parallel to a second axis A2 to concentrate light emitted from the second light emitting area L2. The third brightness enhancement component 20 may comprise a plurality of third optical structures 200, wherein the third optical structures 200 are arranged side by side and parallel to a third axis A3 to concentrate light emitted from the third light emitting area L3. In this embodiment, the first optical structures 160, the second optical structures 180 and the third optical structures 200 may be, but not limited to, prism structures.

After disposing the first brightness enhancement component 16, the second brightness enhancement component 18 and the third brightness enhancement component 20 on the light emitting surface 140 of the light emitting module 14, the first axis A1 is not parallel to the second axis A2 and the first axis A1 is not parallel to the third axis A3 either. In this embodiment, the first axis A1 may be perpendicular to the second axis A2 and the third axis A3, and the second axis A2 may be parallel to the third axis A3, but is not so limited. The invention may adjust the arrangement of the first brightness enhancement component 16, the second brightness enhancement component 18 and the third brightness enhancement component 20 according to the required lighting pattern, such that the first axis A1, the second axis A2 and the third axis A3 may be oriented towards any direction.

When the first light emitting area L1 emits light, the first brightness enhancement component 16 concentrates the light emitted from the first light emitting area L1 with respect to a first plane P1, wherein the first plane P1 is defined by the first axis A1 and a first direction D1 perpendicular to the first brightness enhancement component 16. Similarly, when the second light emitting area L2 emits light, the second brightness enhancement component 18 concentrates the light emitted from the second light emitting area L2 with respect to a second plane P2, wherein the second plane P2 is defined by the second axis A2 and a second direction D2 perpendicular to the second brightness enhancement component 18. Similarly, when the third light emitting area L3 emits light, the third brightness enhancement component 20 concentrates the light emitted from the third light emitting area L3 with respect to a third plane P3, wherein the third plane P3 is defined by the third axis A3 and a third direction D3 perpendicular to the third brightness enhancement component 20.

When all of the light emitting units 144 of the light emitting module 14 are turned on, light emitted from the light emitting units 144 may pass through the first brightness enhancement component 16, the second brightness enhancement component 18 and the third brightness enhancement component 20 to generate a lighting pattern IP1 shown in FIG. 4, so as to provide a wide lighting range and uniform brightness of center. When the light emitting units 144 of the first light emitting area L1 are turned on and the light emitting units 144 of the second light emitting area L2 and the third light emitting area L3 are turned off, light emitted from the first light emitting area L1 may pass through the first brightness enhancement component 16 to generate a lighting pattern IP2 shown in FIG. 4, so as to simulate a circular lighting pattern generated by a circular light head. When the light emitting units 144 of the second light emitting area L2 and the third light emitting area L3 are turned on and the light emitting units 144 of the first light emitting area L1 are turned off, light emitted from the second light emitting area L2 and the third light emitting area L3 may pass through the second brightness enhancement component 18 and the third brightness enhancement component 20 to generate a lighting pattern IP3 shown in FIG. 4, so as to simulate a longitudinal lighting pattern generated by a longitudinal light head. Accordingly, the lighting fixture 1 of the invention can control the first light emitting area L1, the second light emitting area L2 and/or the third light emitting area L3 of the light emitting module 14 to emit light according to different lighting requirements, so as to adjust the required lighting pattern and lighting range through the first brightness enhancement component 16, the second brightness enhancement component 18 and/or the third brightness enhancement component 20.

Figure 5:
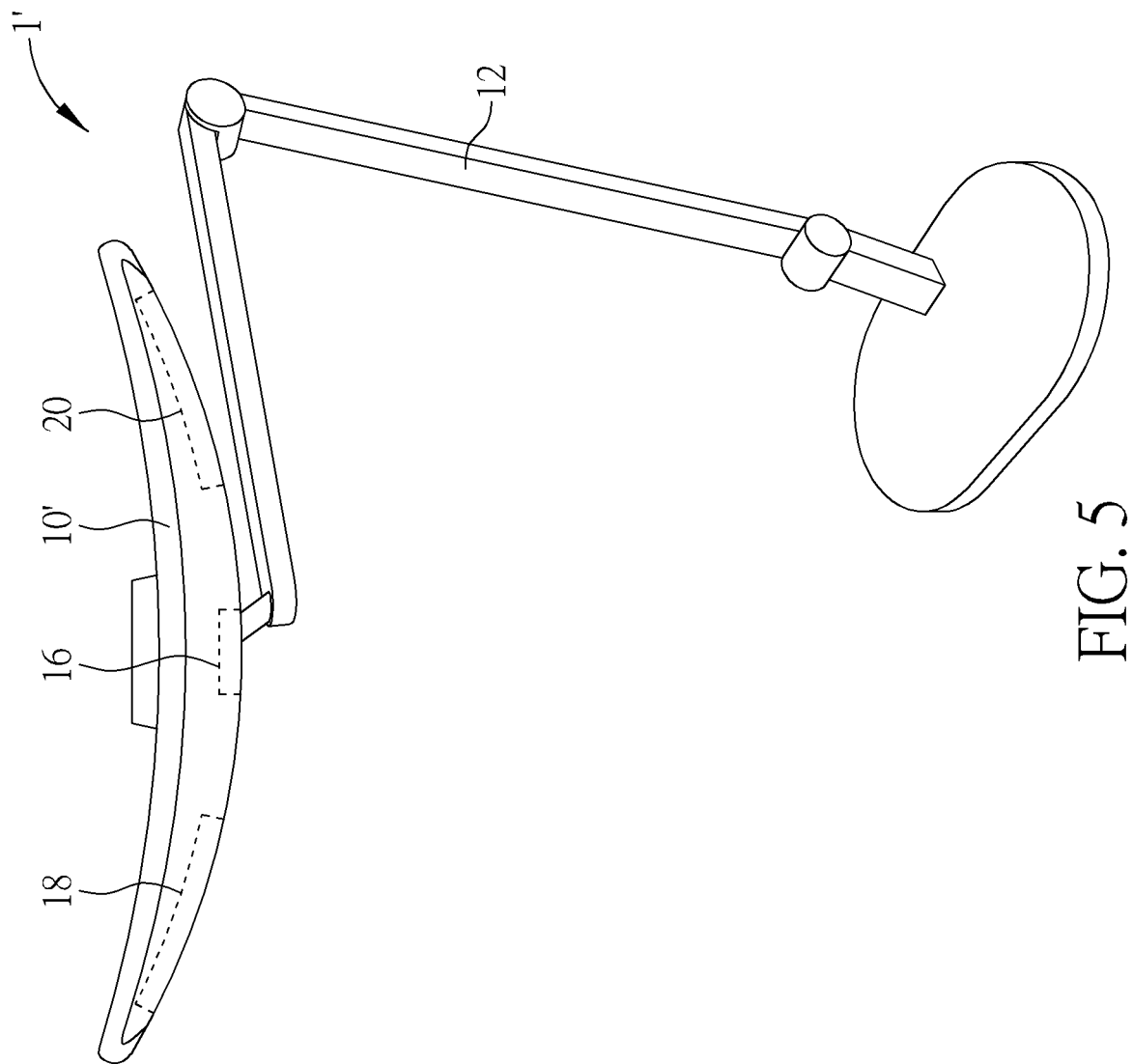
FIG. 5 is a schematic view illustrating a lighting fixture according to another embodiment of the invention.
Figure 6:
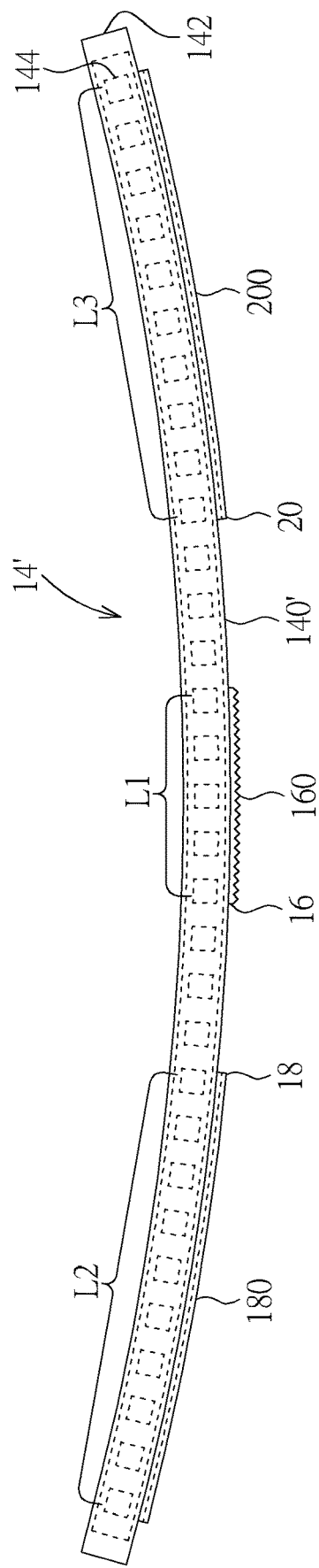
FIG. 6 is a side view illustrating a light emitting module according to another embodiment of the invention.

Referring to FIGS. 5 and 6, FIG. 5 is a schematic view illustrating a lighting fixture 1' according to another embodiment of the invention and FIG. 6 is a side view illustrating a light emitting module 14' according to another embodiment of the invention. It should be noted that the same elements in FIGS. 5-6 and FIGS. 1-3 are represented by the same numerals, so the repeated explanation will not be depicted herein again.

The main difference between the lighting fixture 1' and the aforesaid lighting fixture 1 is that the light head 10' of the lighting fixture 1' is in a curved shape, as shown in FIG. 5. Accordingly, as shown in FIG. 6, the light emitting surface 140' of the light emitting module 14' is in a curved shape corresponding to the light head 10'. Since the first brightness enhancement component 16, the second brightness enhancement component 18 and the third brightness enhancement component 20 are flexible, the first brightness enhancement component 16, the second brightness enhancement component 18 and the third brightness enhancement component 20 may be attached on the curved light emitting surface 140' smoothly. Since the light head 10' of the lighting fixture 1' is in a curved shape, light emitted from opposite sides of the light head 10' may be further expanded to expand the lighting range of the lighting fixture 1'.

In another embodiment, the invention may dispose the first brightness enhancement component 16 and the second brightness enhancement component 18 on the light emitting surface 140 of the light emitting module 14 or on the light emitting surface 140' of the light emitting module 14' without the third brightness enhancement component 20 according to practical applications.

As mentioned in the above, the invention disposes a plurality of brightness enhancement components on the light emitting surface of the light emitting module. Different brightness enhancement components concentrate light emitted from the light emitting surface with respect to different planes, so as to generate different lighting patterns and different lighting ranges. Accordingly, the lighting fixture of the invention can control different light emitting areas of the light emitting module to emit light according to different lighting requirements, so as to adjust the required lighting pattern and lighting range through different brightness enhancement components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting fixture comprising:
a light head being in a curved shape;
a light emitting module being disposed in the light head and comprising a light emitting surface in a curved shape corresponding to the light head;
a first brightness enhancement component being a sheet attached on the light emitting surface and corresponding to a first light emitting area of the light emitting module, the first brightness enhancement component concentrating light emitted from the first light emitting area with respect to a first plane, the first plane being defined by a first axis and a first direction perpendicular to the first brightness enhancement component; and
a second brightness enhancement component being a sheet attached on the light emitting surface and corresponding to a second light emitting area of the light emitting module, the second brightness enhancement component concentrating light emitted from the second light emitting area with respect to a second plane, the second plane being defined by a second axis and a second direction perpendicular to the second brightness enhancement component, the first axis being not parallel to the second axis.

2. The fixture of claim 1, wherein the first axis is perpendicular to the second axis.

3. The lighting fixture of claim 1, wherein the first brightness enhancement component comprises a plurality of first optical structures, the first optical structures are arranged side by side and parallel to the first axis, the second brightness enhancement component comprises a plurality of second optical structures, and the second optical structures are arranged side by side and parallel to the second axis.

4. The lighting fixture of claim 1, further comprising a third brightness enhancement component disposed on the light emitting surface and corresponding to a third light emitting area of the light emitting module, the third brightness enhancement component concentrating light emitted from the third light emitting area with respect to a third plane, the third plane being defined by a third axis and a third direction perpendicular to the third brightness enhancement component, the second brightness enhancement component and the third brightness enhancement component being located at opposite sides of the first brightness enhancement component, and the second light emitting area and the third light emitting area being located at opposite sides of the first light emitting area.

5. The lighting fixture of claim 4, wherein the third brightness enhancement component comprises a plurality of third optical structures and the third optical structures are arranged side by side and parallel to the third axis.

6. The lighting fixture of claim 4, wherein the second axis is parallel to the third axis.

7. The lighting fixture of claim 1, wherein the light emitting module further comprises a light guide plate and a plurality of light emitting units, the light emitting units are disposed at a side of the light guide plate, and the light guide plate provides the light emitting surface.

8. A lighting fixture comprising:
   a light emitting module comprising a light emitting surface;
   a first brightness enhancement component disposed on the light emitting surface and corresponding to a first light emitting area of the light emitting module, the first brightness enhancement component comprising a plurality of first optical structures, the first optical structures being arranged side by side and parallel to a first axis to concentrate light emitted from the first light emitting area;
   a second brightness enhancement component disposed on the light emitting surface and corresponding to a second light emitting area of the light emitting module, the second brightness enhancement component comprising a plurality of second optical structures, the second optical structures being arranged side by side and parallel to a second axis to concentrate light emitted from the second light emitting area, the first axis being not parallel to the second axis; and
   a third brightness enhancement component disposed on the light emitting surface and corresponding to a third light emitting area of the light emitting module, the third brightness enhancement component comprising a plurality of third optical structures, the third optical structures being arranged side by side and parallel to a third axis to concentrate light emitted from the third light emitting area, the second brightness enhancement component and the third brightness enhancement component being located at opposite sides of the first brightness enhancement component, and the second light emitting area and the third light emitting area being located at opposite sides of the first light emitting area.

9. The lighting fixture of claim 8, wherein the first axis is perpendicular to the second axis.

10. The lighting fixture of claim 8, wherein the second axis is parallel to the third axis.

11. The lighting fixture of claim 8, further comprising a light head, the light emitting module being disposed in the light head, the light head being in a curved shape, such that the light emitting surface is in a curved shape corresponding to the light head, wherein the first brightness enhancement component and the second brightness enhancement component are sheets attached on the light emitting surface.

12. The lighting fixture of claim 8, wherein the light emitting module further comprises a light guide plate and a plurality of light emitting units, the light emitting units are disposed at a side of the light guide plate, and the light guide plate provides the light emitting surface.

13. A lighting fixture comprising:
   a light emitting module comprising a light emitting surface, the light emitting surface being a rectangle;
   a first brightness enhancement component being a sheet attached on the light emitting surface and corresponding to a first light emitting area of the light emitting module, the first brightness enhancement component concentrating light emitted from the light emitting surface with respect to a first plane, the first plane being defined by a first axis and a first direction perpendicular to the first brightness enhancement component;
   a second brightness enhancement component being a sheet attached on the light emitting surface and corresponding to a second light emitting area of the light emitting module, the second brightness enhancement component concentrating light emitted from the light emitting surface with respect to a second plane, the second plane being defined by a second axis and a second direction perpendicular to the second brightness enhancement component, the first axis being not parallel to the second axis; and
   a third brightness enhancement component being a sheet attached on the light emitting surface and corresponding to a third light emitting area of the light emitting module, the second light emitting area and the third light emitting area being located at opposite sides of the first light emitting area, the second brightness enhancement component and the third brightness enhancement component being located at opposite sides of the first brightness enhancement component, the third brightness enhancement component concentrating light emitted from the light emitting surface with respect to a third plane, the third plane being defined by a third axis and a third direction perpendicular to the third brightness enhancement component, the first axis being not parallel to the third axis.

* * * * *